Sept. 18, 1945.　　　A. R. THOMAS　　　2,384,860
REFRIGERATION
Filed April 1, 1943
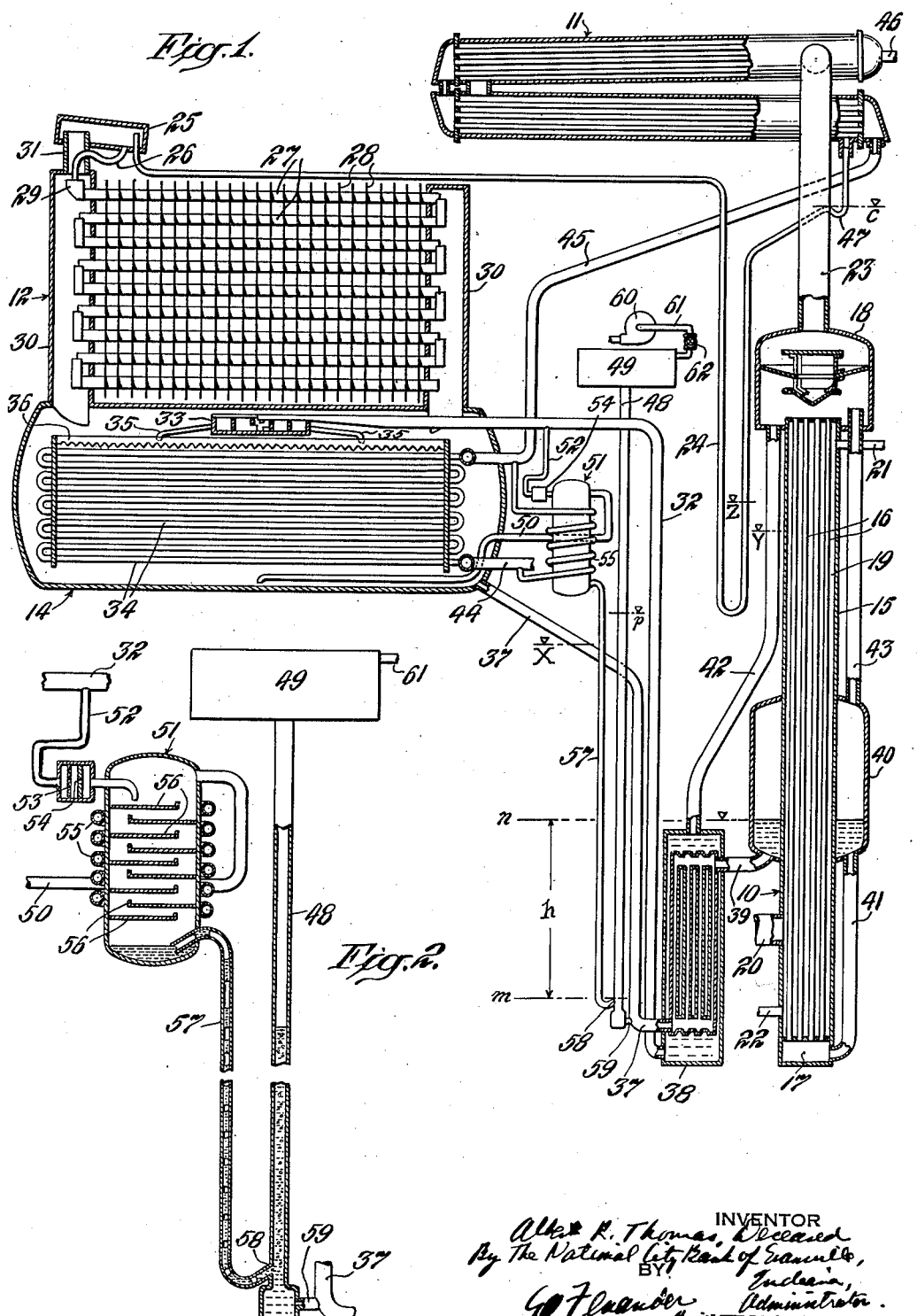

Patented Sept. 18, 1945

2,384,860

UNITED STATES PATENT OFFICE 2,384,860

REFRIGERATION

Albert R. Thomas, deceased, late of Evansville, Ind., by the National City Bank of Evansville, Ind., administrator, Evansville, Ind., assignor to Servel, Inc., New York, N. Y., a corporation of Delaware Application April 1, 1943, Serial No. 481,442

16 Claims. (Cl. 62—119)

This invention relates to refrigeration, and more particularly to refrigeration systems of the absorption type.

When non-condensible gases collect in an absorber of an absorption type refrigeration system, such gases can blanket off and render ineffective a part of the absorber in which absorption of refrigerant vapor by absorption liquid is normally effected. Likewise, when a large quantity of non-condensible gases is allowed to collect in a condenser, the part of the condenser occupied by the gases is rendered ineffective to cool and liquefy refrigerant vapor. Further, any accumulation of non-condensible gases in the absorber and condenser effects an increase in pressure in these parts, thereby reducing the efficiency of and disturbing the normal operation of the refrigeration system.

It is an object of the invention to provide an improvement whereby the amount of space occupied by non-condensible gases in all of the active parts of a refrigeration system, including the absorber and condenser, is always kept at a minimum. This is accomplished by continuously transferring non-condensible gases from the active parts of the system, such as the absorber and the condenser, to an inactive part in which the non-condensible gases do not affect or influence the normal pressures existing in the active parts of the system. By constantly transferring non-condensible gases from all of the active parts of the system to an inactive part, the efficiency of the system will not be impaired and the normal operation of the active parts will not be disturbed.

More particularly, it is an object to transfer non-condensible gases, in a refrigeration system operating at a partial vacuum, to an inactive part which is associated with the system in such a manner that the gases can readily be exhausted from the system to the atmosphere by a vacuum pump without any danger of pumping or withdrawing liquid along with the gases.

When non-condensible gases are removed from the active parts of a refrigeration system, difficulty is encountered in separating the non-condensible gases from vapor in the system. This is particularly true when non-condensible gases are removed from the absorber, because even when the gases are withdrawn from a region at which the gases tend to collect, the non-condensible gases are not localized sufficiently and refrigerant vapor is removed from the absorber along with the gases. While refrigerant vapor can be removed from the non-condensible gases when the gases come into contact with liquid absorbent in a fall tube pump utilized to transfer the non-condensible gases from the absorber, this is objectionable for several reasons. First, the absorption of refrigerant vapor into absorption liquid in a fall tube pump produces objectionable noises. Further, when both refrigerant vapor and non-condensible gases enter the fall tube pump and the vapor is absorbed into absorption liquid therein, gases are withdrawn very slowly from the absorber. Under these conditions non-condensible gases are removed from the absorber at an extremely slow rate which might be likened to a more or less stagnant flow comparable to movement of gas by diffusion.

It is, therefore, another object of the invention to provide an improvement whereby the non-condensible gases are deprived of refrigerant vapor immediately after passing from the active part of the system in which such gases are collecting. This is accomplished in the embodiment illustrated and described herein by employing a relatively small absorber, hereinafter referred to as an auxiliary absorber, which is arranged to receive non-condensible gases directly from the region in the primary or main absorber of the system in which the non-condensible gases collect. Even though refrigerant vapor is withdrawn from the primary absorber along with the non-condensible gases, such refrigerant vapor is absorbed into absorption liquid in the relatively small auxiliary absorber. By providing an auxiliary absorber in communication with the main absorber in which non-condensible gases are collecting, and establishing a slight pressure differential between these parts, extremely rapid flow of non-condensible gases from the main absorber is effected which might be referred to as a positive flow in contradistinction to a relatively slow movement approaching the movement of gases by diffusion.

The non-condensible gases deprived of refrigerant vapor are localized in a relatively small space in the auxiliary absorber, and such gases may be transferred to the inactive part of the system by a fall tube pump. Since the gases entering the fall tube pump are practically free of refrigerant vapor and only a very small amount of refrigerant vapor is absorbed into absorbent in the fall tube pump, the gases are transferred at an extremely rapid rate to the inactive part of the system.

The invention, together with the above and other objects and advantages thereof, will be better understood from the following description taken in connection with the accompanying drawing forming a part of the specification, and of which:

Fig. 1 more or less diagrammatically illustrates a refrigeration system embodying the invention; and Fig. 2 is an enlarged fragmentary view of parts shown in Fig. 1 to illustrate the invention more clearly.

Referring to Fig. 1, the invention is embodied in a two-pressure absorption refrigeration system like that described in United States Letters Patent No. 2,282,503 of A. R. Thomas and P. P. Anderson, Jr., granted May 12, 1942. A system of this type operates at low pressures and includes a generator or vapor expeller 10, a condenser 11, an evaporator 12 and an absorber 14 which are interconnected in such a manner that the pressure differential in the system is maintained by liquid columns. The disclosure in the aforementioned Thomas and Anderson patent may be considered as being incorporated in this application, and, if desired, reference may be made thereto for a detailed description of the refrigeration system.

In Fig. 1 the generator includes an outer shell 15 within which are disposed a plurality of vertical riser tubes 16 having the lower ends connected to receive liquid from a space 17 and the upper ends extending into and above the bottom of a vessel 18. The space 19 within shell 15 forms a chamber to which steam is supplied through a conduit 20 from a suitable source of supply, so that full length heating of the tubes 16 is effected. A vent 21 is provided at the upper end of shell 15, and a conduit 22 is connected to the bottom part of the shell for draining condensate from the space 19.

The system operates at a partial vacuum and contains a water solution of refrigerant in absorbent liquid, such as, for example, a water solution of lithium chloride or lithium bromide. When steam is supplied through conduit 20 to space 19 at atmospheric pressure, heat is supplied to tubes 16 for expelling water vapor from solution. The absorption liquid is raised by gas or vapor lift action, the expelled water vapor forming a central core within an upwardly rising annulus of the liquid. In vapor-liquid lifts of this character the expelled water vapor rises more rapidly than the liquid, and the liquid follows the vapor along the inside walls of the tubes 16.

The water vapor discharged from the upper ends of the tubes or risers 16 separates from the raised absorption liquid in the vessel 18 and flows through a conduit 23 into condenser 11. The condensate formed in condenser 11 flows through a U-tube 24 into a chamber 25 and from the latter through a tube 26 into evaporator 12.

The evaporator 12 may include a plurality of horizontal banks of tubes 27 disposed one above the other and having heat transfer fins 28 secured thereto to provide a relatively extensive heat transfer surface. The liquid flowing to evaporator 12 is divided in any suitable manner for flow through the uppermost bank of tubes 27. For example, the dividing of liquid may be effected by a liquid distributing trough 29 into which the liquid flows from the tube 26. The water flows in successively lower tubes through suitable end connections which are open to permit escape of vapor from the tubes. Any excess liquid refrigerant is discharged from the lowermost tubes 27.

The water supplied to tubes 27 evaporates therein to produce a refrigerating or cooling effect with consequent absorption of heat from the surroundings, as from a stream of air flowing over the exterior surfaces of the tubes 27 and fins 28. The vapor formed in tubes 28 passes out into end headers 30 which are connected at their lower ends to absorber 14. Any vapor formed in chamber 25 passes through a conduit 31 into one of the headers 30 and mixes with vapor formed in the evaporator 12, so that disturbances in the evaporator due to vapor flashing of incoming liquid are avoided.

In absorber 14 refrigerant vapor is absorbed into absorption liquid entering through a conduit 32. The entering absorption liquid flows into a vessel 33 in which liquid is distributed laterally of a plurality of vertically disposed pipe banks 34 arranged alongside of each other. The liquid flows from vessel 33 through conduits 35 into a plurality of liquid holders and distributors 36 which extend lengthwise of and above the uppermost branches of the pipe banks 34. Absorption liquid is siphoned over the walls of the liquid holders 36 onto the uppermost pipe sections. Liquid drips from each horizontal pipe section onto the next lower pipe section, so that all of the pipe sections are wetted with a film of liquid.

The water vapor formed in evaporator 12 passes through the headers 30 into the absorber 14 where it is absorbed by absorption liquid. Absorption liquid flows from absorber 14 through a conduit 37, a first group of passages in liquid heat exchanger 38, conduit 39, vessel 40, and conduit 41 into the bottom space 17 of generator 10. Water vapor is expelled out of solution in generator 10 by heating, and liquid is raised by gas or vapor lift action in riser tubes 16, as explained above.

The absorption liquid in vessel 18, from which refrigerant has been expelled from solution, flows through a conduit 42, another group of passages in liquid heat exchanger 38 and conduit 32 into the upper part of absorber 14. This circulation of absorption liquid is effected by raising liquid in the vertical riser tubes 16 by vapor lift action, so that liquid can flow from generator 10 to absorber 14 and return from the latter back to the generator by force of gravity.

The upper part of vessel 40 is connected by conduit 43 to vessel 18, so that the pressure in vessel 40 is equalized with the pressure in the upper part of generator 10 and condenser 11. The vessel 40 is of sufficient volume to hold the liquid differential in the system and is of sufficient cross-sectional area that the liquid level therein does not appreciably vary, so that a substantially constant reaction head is provided for lifting liquid in generator 10.

The heat liberated with absorption of water vapor in absorber 14 is transferred to a cooling medium, such as water, which flows upward through the vertically disposed pipe banks 34. The cooling medium enters the lower end of the pipe banks through a conduit 44 and leaves the upper end of the pipe banks through a conduit 45. The conduit 45 may be connected to condenser 11 so that the same cooling medium may be utilized to effect cooling of both the condenser 11 and absorber 14. From condenser 11 the cooling medium flows through a conduit 46 to waste.

The system operates at low pressures with the generator 10 and condenser 11 operating at one pressure and evaporator 12 and absorber 14 operating at a lower pressure, the pressure differential therebetween being maintained by liquid collums. Thus, the liquid column formed in tube 24 maintains the pressure differential between condenser 11 and evaporator 12. The liquid column in conduit 37 maintains the pressure differential between the outlet of absorber 14 and generator 10, and the liquid column formed in conduit 32 and connected parts including conduit 42 maintains the pressure differential between the inlet of the absorber and the upper part of the generator 10. In operation, the liquid columns may form in conduits 37, 42 and downleg of tube 24 to the levels x, y and z, for example. The conduits are of such size that restriction to gas flow is effected without appreciably restricting flow of liquid.

During operation of the refrigeration system non-condensible gases may collect in the system, and in condenser 11 such gases flow toward the dead-end or bottom part of the condenser. To transfer and remove non-condensible gases from condenser 11 to the lower pressure side of the system, a liquid trap 47 is provided in conduit 24. Liquid formed in condenser 11 flows into trap 47, and, when the trap is completely filled with liquid to the level c, the liquid is siphoned from the trap into the downleg of U-tube 24. The gas in the downleg of U-tube 24, in the region between the trap 47 and the liquid level at z, is trapped by the liquid siphoned from the liquid trap 47. Immediately after liquid has siphoned from the liquid trap 47, gas passes from the bottom part of condenser 11 through the trap 47 into the downleg of U-tube 24. When liquid passing from condenser 11 again reaches the level c in the trap 47, liquid is again siphoned into the downleg of the tube 24. In this manner gas passing from condenser 11 into the downleg of the tube 24, before the liquid seal is formed in trap 47, is segregated by the liquid subsequently siphoned into the downleg of the tube.

The gas segregated between the successive bodies of liquid siphoned from trap 47 is compressed by the siphoned liquid and passes through the U-tube 24 from condenser 11 to evaporator 12. In this way non-condensible gases collecting in the upper part of generator 10 and condenser 11 are transferred from these parts of the system to the evaporator 12 and absorber 14 from which the non-condensible gases are transferred to an inactive part of the system, as will now be described.

In accordance with this invention, in order to transfer non-condensible gases from evaporator 12 and absorber 14 to vertical tube 48 and storage vessel 49 forming the inactive part of the system, the non-condensible gases are withdrawn from the bottom of absorber 14 through a conduit 50 to the top part of an auxiliary absorber 51. Although not to be limited thereto, the auxiliary absorber 51 is shown in the form of an upright receiving vessel which is relatively small compared to the size of absorber 14.

Absorption liquid is introduced into the upper part of absorber 51 through a conduit 52. The conduit 52 is connected to the upper part of conduit 32 through which absorption liquid is introduced into the upper part of absorber 14. The absorption liquid diverted from conduit 32 into conduit 52 passes through a suitable filter 53 and a flow restricting device 54 formed by a barrier or wall having an orifice therein. From the flow restricting device 54 in conduit 52 the absorption liquid is introduced into the upper part of the auxiliary absorber 51.

The auxiliary absorber 51 is provided with a cooling coil 55 through which a suitable cooling medium, such as water, is circulated. In Fig. 1 the lower end of coil 55 is connected to conduit 44 and the upper end thereof is connected to conduit 45. Thus, a part of the cooling water flowing to the main absorber 14 through conduit 44 is diverted into coil 55 of the auxiliary absorber 51. The cooling water passing from the upper end of coil 55 joins cooling water in conduit 45 into which the cooling medium is discharged from the upper end of absorber 14.

The absorption liquid flows downwardly in auxiliary absorber 51 over staggered plates 56. To the bottom part of absorber 51 is connected the upper curved or rounded portion of a vertical tube 57. The lower end of tube 57 is connected at 58 to the bottom part of vertical tube 48, and the latter is connected by a conduit 59 to the bottom part of conduit 37 through which absorption liquid flows from the bottom or outlet of absorber 14 toward generator 10.

It will be observed from the foregoing description that the conduit 52, auxiliary absorber 51, vertical tube 57, lower end of the tube 48 and conduit 59 constitute a bypass between the conduits 32 and 37 constituting separate paths of flow for absorption solution between the generator 10 and absorber 14. It also will be observed that the bypass will receive absorption liquid from the conduit 32 at the low pressure prevailing in the absorber 14 and will deliver absorption liquid to the conduit 37 at the high pressure prevailing in the generator 10.

During operation of the refrigeration system, non-condensible gases may collect in both the high and lower pressure sides of the system. The non-condensible gases collecting in the higher pressure side of the system, that is, the generator 10 and condenser 11, are carried to the dead or far end of the condenser in the bottom part thereof by the sweeping effect of the refrigerant vapor flowing into the condenser.

Since the non-condensible gases are swept to the bottom part of the condenser 11, the U-tube 24 is effectively utilized to transfer such gases from the condenser 11 to the evaporator 12 by providing the trap 47 therein. The trap 47, as explained above, effectively traps gas in the downleg of tube 24 between slugs of liquid intermittently siphoned from the trap. Hence, the liquid refrigerant flowing through tube 24 to evaporator 12 carries with it the non-condensible gases collecting in the condenser 11 and the generator 10.

The non-condensible gases in the lower pressure side of the system, that is, in the evaporator 12 and absorber 14, are carried to the bottom part of the absorber by the sweeping action of the refrigerant vapor entering the top of the absorber through the headers 30. By sweeping action it is meant that a downward movement is imparted to the non-condensible gases by the high velocity of the water vapor flowing into the absorber. In a refrigeration system generally like that described and having an ice melting capacity of about five tons, and the evaporator at a temperature of about 50° F. and the system operating at full load, the average velocity of the vapor escaping from the evaporator to the absorber is about 130 feet per second. Under these conditions the vapor pressure in the evaporator is approximately 9.25 mm. Hg. and that in the absorber is approximately 0.1 mm. Hg. lower. Hence, the forces produced by the escaping vapor are utilized to sweep the non-condensible gases to the bottom part of the absorber 14 midway between the headers 30.

In order to localize the non-condensible gases in a relatively small space, such gases are withdrawn from the bottom part of absorber 14 through a conduit 50 to the top part of the auxiliary absorber 51. A small portion of the absorption liquid flowing toward the upper part of absorber 14 in conduit 32 is diverted into conduit 52. The screen 53 removes any foreign matter in the diverted liquid tending to clog the flow restricting device 54, and the restricting device in turn limits the rate at which liquid is diverted into conduit 52 from the main stream of absorption liquid flowing in conduit 32. The absorption liquid flows over the plates 56 to provide a relatively extensive liquid surface.

While the gases withdrawn from absorber 14 through conduit 50 into auxiliary absorber 51 are for the most part non-condensible, these gases are not sufficiently localized in the bottom of the main absorber 14 and tests have shown that refrigerant vapor accompanies the non-condensible gases withdrawn from the main absorber. For this reason the gases withdrawn from absorber 14 are brought into intimate contact with diverted absorption liquid in the auxiliary absorber 51. Refrigerant vapor accompanying the non-condensible gases withdrawn from main absorber 14 is absorbed into absorption liquid in auxiliary absorber 51. The heat liberated with absorption of refrigerant vapor in auxiliary absorber 51 is transferred to the cooling medium flowing through coil 55. The absorption liquid and gases both flow downwardly in auxiliary absorber 51, that is, the gas and liquid are in parallel flow, and the gases at the bottom part of the auxiliary absorber are deprived of refrigerant vapor.

The liquid flowing by gravity to the bottom part of auxiliary absorber 51 enters the upper end of conduit 57 until the conduit is closed with liquid and sealed from the gases in the bottom part of the auxiliary absorber. When the liquid level rises sufficiently in the upper curved or bent portion of conduit 57, the small quantity of liquid within the open end is siphoned past the bend into the downwardly depending straight portion which is connected at its lower end at 58 to the vertical tube 48. When liquid is siphoned from the upper curved end of conduit 57, the liquid level falls in the bottom part of the auxiliary absorber 51 below the upper open end of conduit 57, so that non-condensible gases can pass into the upper bend or curved part of the conduit. The liquid level in the bottom part of the absorber 51 again rises to close and seal the upper end of conduit 57, and, when the liquid level again rises sufficiently, a small quantity of liquid is once more siphoned into the downwardly depending straight portion of conduit 57. In this way small quantities of non-condensible gases are withdrawn from the bottom part of auxiliary absorber 51 and trapped between successive bodies of slugs of liquid formed at the upper curved or bent portion of the conduit 57.

The conduit 57, which may be referred to as a fall tube pump, is of such size that flow of liquid is not appreciably restricted with the internal diameter being such that gas and liquid cannot pass each other while flowing downwardly through the conduit. When employing a solution of lithium bromide of about 55% concentration by weight as an absorbent in a system of the type described, a conduit having an internal diameter of about 0.180 inch has operated in a satisfactory manner to trap small quantities of gas between slugs of liquid.

The gas trapped between slugs of liquid in conduit 57 is compressed as the liquid and gas pass downwardly in the conduit. Whereas the internal diameter of conduit 57 is such that the trapped gas bubbles and liquid slugs cannot pass each other, the internal diameter of vertical tube 48 is considerably greater than that of conduit 57 so that gas bubbles freely pass upwardly through liquid therein, as diagrammatically shown in Fig. 2.

As the quantity of non-condensible gases trapped in vertical tube 48 and vessel 49 increases, the liquid level in tube 48 falls due to the gases displacing liquid from the tube through conduit 59 into conduit 37. When the liquid in tube 48 falls from the maximum level $p$ to the minimum level $m$ in Fig. 1, the trapped gases may be exhausted from the refrigeration system to the atmosphere by a suitable vacuum pump. For example, a vacuum pump 60 may be connected by a conduit 61 to vessel 49 for withdrawing non-condensible gases from the system. A suitable valve 62 may be provided in conduit 61 to maintain the system at a low pressure.

The generator 10, condenser 11, evaporator 12 and absorber 14 may be referred to as active parts of the refrigeration system inasmuch as they are necessary parts for the operation of the system. The vertical tube 48 and vessel 49, on the other hand, may be referred to as an inactive part in the sense that it does not function actively in producing refrigeration. By constantly transferring non-condensible gases from the higher pressure side of the system through tube 24, as explained above, the generator 10 and condenser 11 are maintained substantially free of non-condensible gases. Likewise, by constantly withdrawing non-condensible gases from the lower pressure side to the tube 48 and vessel 49, the evaporator 12 and absorber 14 are maintained substantially free of non-condensible gases. Since non-condensible gases cannot accumulate in the active parts of the refrigeration system, such gases cannot cause an increase in pressure in these parts, so that the non-condensible gases cannot adversely effect the efficiency of the system nor impair the normal operation thereof.

The non-condensible gases collecting in the inactive part of the system formed by the tube 48 and vessel 49 displaces liquid therefrom, as stated above. When the liquid is at a maximum level in tube 48, as at the level $p$, for example, the pressure in vessel 49 is in equilibrium with the vapor pressure of the absorption liquid in the tube. In a refrigeration system of the type referred to above and having an ice melting capacity of about five tons, and in which a solution of lithium bromide of about 55% concentrations by weight is employed, the pressure in vessel 49 and above the liquid level $p$ may be about 7 mm. Hg.

The liquid in vessel 40 is at about the level $n$, as shown most clearly in Fig. 1. In a system of the type referred to above, it has already been stated that the pressure in evaporator 12 may be about 9.25 mm. Hg. Under such conditions the pressure in the high pressure side, and hence above the liquid in vessel 40, may be about 56 mm. Hg. Thus, when the liquid in vertical tube 48 is at the maximum level $p$, the pressure above the liquid in vessel 40 is balanced in the inactive part by the pressure in vessel 49 and the portion of the liquid column in tube 48 extending downwardly from the maximum level p to the level n, at which level the liquid stands in vessel 49.

The fact that the liquid column in vertical tube 48 can balance the pressure in the high pressure side of the system is of distinct advantage because, when the vacuum pump 60 is operating to exhaust non-condensible gases to the atmosphere from the tube 48 and vessel 49 and the pressure in these parts falls below the pressure in the high pressure side of the system, no liquid is pumped from the system. Even when the vacuum pump 60 is operating with valve 62 open and the pressure in the vessel 49 is in the minimum range of about seven mm. Hg. and the liquid in the tube 48 is at the maximum level p, the liquid column in tube 48 can balance the pressure of about 56 mm. Hg. in the high pressure side of the system, and there is no danger of exhausting liquid from the system by the action of the vacuum pump. Thus, no liquid can be pumped by the vacuum pump from the inactive part formed by tube 48 and vessel 49, and at the same time the inactive part does not need to be of unusual height for, as illustrated in the drawing, the vessel 49 is well within the normal height of the refrigeration system determined by the position of the condenser 11.

As liquid in vertical tube 48 is displaced by non-condensible gases transferred thereto, the liquid in the tube falls until it reaches the minimum level m. When the liquid reaches this minimum level, the pressure in the upper part of the tube 48 and vessel 49 is at a maximum. This pressure in a system of the type previously referred to is approximately 100 mm. Hg., and is balanced on the high pressure side of the system by the pressure above the liquid level n in vessel 40 and the weight of the liquid column h extending downwardly from vessel 40 through conduit 39 and one group of passages in liquid heat exchanger 38 to which the lower end of vertical tube 48 is connected. Likewise, the pressure in auxiliary absorber 51 and the column of liquid slugs and trapped gas bubbles in conduit 57 balances the column of liquid in tube 48 and pressure existing above this liquid column.

Thus, while the pressures in the high and lower pressure sides of a system like that referred to above remain at about 56 and 9.25 mm. Hg., which pressures may be referred to as normal operating pressures, the pressure of the non-condensible gases transferred to the tube 48 and vessel 49 may become as high as 100 mm. Hg. without adversely effecting the efficiency and disturbing the normal operation of the system.

By providing the auxiliary absorber 51, the non-condensible gases withdrawn from the main absorber 14 are localized in a relatively small space compared to the space in which the gases collect in the main absorber. Since the gases entering the fall tube pump 57 in the auxiliary absorber 51 are substantially deprived of refrigerant vapor, and the amount of refrigerant vapor entering the fall tube pump is extremely small, the amount of refrigerant vapor absorbed into absorption liquid in the fall tube pump is negligible. Hence, the production of objectionable noises resulting from absorption of refrigerant into absorbent in the fall tube pump, is avoided. Moreover, since only a very small and negligible amount of refrigerant vapor enters the upper end of the fall tube pump 57, the non-condensible gases are withdrawn at a maximum rate from the auxiliary absorber 51. Thus, with the non-condensible gases being withdrawn at a maximum rate from the auxiliary absorber, such gases withdrawn from the auxiliary absorber are replaced at a rapid rate with non-condensible gases and refrigerant vapor from the bottom part of the main absorber 14.

It should now be apparent that the rate at which non-condensible gases are transferred from the main absorber 14 to the inactive part formed by vertical tube 48 and vessel 49 is dependent upon the effectiveness of the auxiliary absorber 51 in removing refrigerant vapor from the non-condensible gases. By employing the trays 56 to provide a relatively extensive gas and liquid contact surface, and employing cooling coil 55 to take up the heat of absorption resulting from absorption of refrigerant vapor into solution, refrigerant vapor is effectively absorbed into solution and the pressure in the auxiliary absorber 51 is slightly less than the pressure existing in the main absorber 14. With this slight pressure differential between the auxiliary absorber 51 and the bottom of the main absorber 14, a positive flow of gases from the bottom of the main absorber to a slightly lower pressure region in the auxiliary absorber is established. In the embodiment illustrated and described this slight pressure differential exists because the absorption liquid diverted into auxiliary absorber 51 is weak in refrigerant while the absorbent in the bottom of the main absorber 14 is relatively rich in refrigerant, so that the vapor pressure of refrigerant in the auxiliary absorber is less than that at the bottom of the main absorber 14.

Therefore, by removing refrigerant vapor from the non-condensible gases in the auxiliary absorber 51, positive flow of gases from the bottom part of the main absorber 14 is established, and the non-condensible gases in turn are withdrawn from the auxiliary absorber 51 very rapidly because practically no absorption of refrigerant vapor into absorbent takes place in the fall tube pump 57 to cause the pumping rate to slow down to such a point that the flow of gases from the main absorber 14 through conduit 50 approaches what might be referred to as more or less a stagnant flow.

While a single embodiment of the invention has been shown and described, it will be apparent to those skilled in the art that various modifications and changes may be made without departing from the spirit and scope of the invention, as pointed out in the following claims.

What is claimed is:

1. In the art of transferring non-condensible gas in an absorption refrigeration system from an active part to an inactive part, such system being of the kind which operates below atmospheric pressure and from the inactive part of which the non-condensible gas is exhausted outside of the system with the aid of a vacuum pump, the improvement which consists in effecting circulation of liquid weak in refrigerant from the generator to the absorber and liquid strong in refrigerant from the absorber to the generator, diverting part of the ciculating liquid weak in refrigerant in a downward path of flow from a part of the circuit, flowing the diverted liquid into contact with non-condensible gas from said active part to effect trapping of the gas, separating the trapped gas from the diverted liquid at a region in communication with said inactive part, and then returning the diverted liquid to said circuit along with liquid displaced from said inactive part by non-condensible gas transferred thereto.

2. A method of transferring gas from an absorber to an inactive part of the refrigeration system which does not actively participate in the production of refrigeration, which includes flowing absorption liquid weak in refrigerant in a first path of flow towards said absorber and flowing absorption liquid rich in refrigerant in another path of flow from said absorber, diverting a portion of the absorption liquid weak in refrigerant from said first path of flow to said absorber and utilizing such diverted liquid to trap gas from said absorber by forming slugs of the liquid, so as to produce a column of the slugs and trapped segregated bodies of gas extending downward from the region at which the absorption liquid is diverted from said first path of flow, separating the trapped gas from the liquid in the lower part of said column, flowing the separated gas to said inactive part of the system whereby absorption liquid is displaced therefrom, and flowing such displaced liquid and diverted liquid from the lower part of said column to said other path of flow to mix with liquid rich in refrigerant flowing from said absorber, and exhausting non-condensible gas from said inactive part to the atmosphere.

3. An absorption refrigeration system having a generator and condenser operable at one pressure and an evaporator and absorber operable at a lower pressure, means interconnecting the elements to provide a closed circuit for the circulation of a refrigerant and absorbent and maintain the pressure differential, said last named means providing separate paths of flow between the generator and absorber for absorption liquid weak in refrigerant and absorption liquid strong in refrigerant, a bypass connected between the separate paths of flow to cause a flow of absorption liquid therebetween, and means in the bypass utilizing the flow of absorption liquid therein for withdrawing non-condensible gases from the system and storing the gases.

4. An absorption refrigeration system having a generator and condenser operable at one pressure and an evaporator and absorber operable at a lower pressure, means interconnecting the elements to provide a closed circuit for the circulation of a refrigerant and absorbent and maintain the pressure differential, means for transferring non-condensible gases from the condenser to the evaporator, said non-condensible gases in the evaporator being transferred to the absorber with the refrigerant vapors flowing thereto and accumulating at the bottom of the absorber where turbulence is at a minimum, said interconnecting means providing separate paths of flow between the generator and absorber for absorption liquid weak in refrigerant and absorption liquid strong in refrigerant, a bypass connected between the separate paths of flow to cause a flow of absorption liquid therebetween, and means in the bypass utilizing the flow of absorption liquid therein for withdrawing the non-condensible gases from the absorber and storing the gases.

5. An absorption refrigeration system having a generator and condenser operable at one pressure and an evaporator and absorber operable at a lower pressure, means interconnecting the elements to provide a closed circuit for the circulation of a refrigerant and absorbent and maintaining the pressure differential, said last named means providing separate paths of flow between the generator and absorber for absorption liquid weak in refrigerant and absorption liquid strong in refrigerant, a bypass connected between the separate paths of flow to cause a flow of absorption liquid therebetween, means in the bypass comprising a fall tube pump utilizing the flow of absorption liquid therethrough for withdrawing non-condensible gases from the system, and a storage vessel connected to the by-pass for receiving and storing the gases.

6. An absorption refrigeration system having a generator and condenser operable at one pressure and an evaporator and absorber operable at a lower pressure, means interconnecting the elements to provide a closed circuit for the circulation of a refrigerant and absorbent and maintain the pressure differential, said last named means providing separate paths of flow between the generator and absorber for absorption liquid weak in refrigerant and absorption liquid rich in refrigerant, a bypass connected between the separate paths of flow to cause a flow of absorption liquid therebetween, means in the bypass comprising a fall tube pump utilizing the flow of absorption liquid therethrough for withdrawing non-condensible gases from the system, a storage vessel connected to the bypass for receiving and storing the gases, and an exhaust pump connected to the storage vessel for removing the non-condensible gases therefrom.

7. An absorption refrigeration system having a generator and condenser operable at one pressure and an evaporator and absorber operable at a lower pressure, means interconnecting the elements to provide a closed circuit for the circulation of a refrigerant and absorbent and maintain the pressure differential, said last named means providing separate paths of flow between the generator and absorber for absorption liquid weak in refrigerant and absorption liquid strong in refrigerant, a bypass connected between the separate paths of flow to cause a flow of absorption liquid therebetween, a receiving vessel in the bypass and connected to the absorber to receive non-condensible gases therefrom, a storage vessel connected to the bypass, and a fall tube pump in the bypass utilizing the flow of absorption liquid therethrough for transferring the non-condensible gases from the receiving vessel to the storage vessel.

8. An absorption refrigeration system having a generator and condenser operable at one pressure and an evaporator and absorber operable at a lower pressure, means interconnecting the elements to provide a closed circuit for the circulation of a refrigerant and absorbent and maintain the pressure differential, said last named means providing separate paths of flow between the generator and absorber for absorption liquid weak in refrigerant and absorption liquid strong in refrigerant, a bypass having one end connected to one path of flow adjacent the absorber to receive liquid therefrom at low pressure and having its opposite end connected to the other path of flow adjacent the generator to discharge the liquid at a higher pressure, a receiving vessel in the bypass adjacent its low pressure end and connected to the absorber to receive non-condensible gases therefrom, a storage vessel connected to the bypass adjacent its high pressure end, and a fall tube pump in the bypass utilizing the flow of absorption liquid therethrough for transferring the non-condensible gases from the low pressure receiving vessel to the high pressure storage vessel.

9. An absorption refrigeration system having a generator and condenser operable at one pressure and an evaporator and absorber operable at a lower pressure, means interconnecting the elements to provide a closed circuit for the circulation of a refrigerant and absorbent and maintain the pressure differential, said last named means providing separate paths of flow between the generator and absorber for absorption liquid weak in refrigerant and absorption solution strong in refrigerant, a bypass connected between the separate paths of flow to cause a flow of absorption liquid therebetween, means in the bypass utilizing the flow of absorption liquid therein for withdrawing non-condensible gases from the system, and a vertical tube connected to the bypass to receive the non-condensible gases, said tube being of sufficient height to maintain a liquid column corresponding to the pressure in the bypass.

10. An absorption refrigeration system having a generator and condenser operable at one pressure and an evaporator and absorber operable at a lower pressure, means interconnecting the elements to provide a closed circuit for the circulation of a refrigerant and absorbent and maintain the pressure differential, said last named means providing separate paths of flow between the generator and absorber for absorption liquid weak in refrigerant and absorption liquid strong in refrigerant, a bypass connected between the separate paths of flow to cause a flow of absorption liquid therebetween, means in the bypass utilizing the flow of absorption liquid therein for withdrawing non-condensible gases from the system, a vertical tube connected to the bypass to receive the non-condensible gases, said tube being of sufficient height to maintain a liquid column corresponding to the pressure in the bypass, and a vacuum pump connected to the upper end of the vertical tube for withdrawing non-condensible gases therefrom without withdrawing any absorption liquid.

11. An absorption refrigeration system having a generator and condenser operable at one pressure and an evaporator and absorber operable at a lower pressure, means interconnecting the elements to provide a closed circuit for the circulation of a refrigerant and absorbent and maintain the pressure differential, said last named means providing separate paths of flow between the generator and absorber for absorption liquid weak in refrigerant and absorption liquid strong in refrigerant, a bypass connected between the separate paths of flow to cause a flow of absorption liquid therebetween, means in the bypass utilizing the flow of absorption liquid therein for withdrawing non-condensible gases from the system, a vertical tube connected to the bypass to receive the non-condensible gases, a storage vessel at the upper end of the vertical tube, and a vacuum pump connected to the storage vessel for withdrawing non-condensible gases therefrom, said tube being of sufficient height to maintain a liquid column corresponding to the pressure in the bypass when the storage vessel is evacuated.

12. An absorption refrigeration system having a generator and condenser operable at one pressure and an evaporator and absorber operable at a lower pressure, means interconnecting the elements to provide a closed circuit for the circulation of a refrigerant and absorbent and maintain the pressure differential, said last named means including a syphon pump for transferring non-condensible gases from the high pressure condenser to the low pressure evaporator, said gases in the evaporator being transferred to the absorber by the flow of refrigerant vapor therebetween, said interconnecting means also providing separate paths of flow between the generator and absorber for absorption liquid weak in refrigerant and absorption liquid strong in refrigerant, a bypass connected between the separate paths of flow to cause a flow of absorption liquid therebetween, a receiving vessel in the bypass and connected to the absorber to receive non-condensible gases therefrom, a storage vessel connected to the bypass, a fall tube pump in the bypass utilizing the flow of absorption liquid therethrough for transferring the non-condensible gases from the receiving vessel to the storage vessel, and a vacuum pump connected to the storage vessel for withdrawing non-condensible gases therefrom.

13. An absorption refrigeration system having a generator and condenser operable at one pressure and an evaporator and absorber operable at a lower pressure, means interconnecting the elements to provide a closed circuit for the circulation of a refrigerant and absorbent and maintain the pressure differential, said last named means including a first path of flow for absorption liquid weak in refrigerant from the generator to the absorber and a second path of flow for absorption liquid strong in refrigerant from the absorber to the generator, a bypass connected between the first and second paths of flow to cause a flow of absorption liquid weak in refrigerant therethrough, an auxiliary absorber in the bypass and connected to the absorber to receive non-condensible gases therefrom, a storage vessel connected to the bypass, and a fall tube pump in the bypass utilizing the flow of absorption liquid therethrough to transfer non-condensible gases from the auxiliary absorber to the storage vessel.

14. An absorption refrigeration system having a generator and condenser operable at one pressure and an evaporator and absorber operable at a lower pressure, means interconnecting the elements to provide a closed circuit for the circulation of a refrigerant and absorbent and maintain the pressure differential, said last named means including a first path of flow for absorption liquid weak in refrigerant from the generator to the absorber and a second path of flow for absorption liquid strong in refrigerant from the absorber to the generator, a bypass connected between the first and second paths of flow to cause a flow of absorption liquid weak in refrigerant therethrough, an auxiliary absorber in the by-pass and connected to the absorber to receive non-condensible gases therefrom, the absorption liquid weak in refrigerant flowing through the auxiliary absorber absorbing refrigerant vapor to segregate non-condensible gases therein, means for cooling the auxiliary absorber to remove the heat of absorption, a storage vessel connected to the bypass, and a fall tube pump in the bypass utilizing the flow of absorption liquid therethrough to transfer non-condensible gases from the auxiliary absorber to the storage vessel.

15. An absorption refrigeration system having a generator and condenser operable at one pressure and an evaporator and absorber operable at a lower pressure, means interconnecting the elements to provide a closed circuit for the circulation of a refrigerant and absorbent and maintain the pressure differential, said last named means including a first path of flow for absorption liquid weak in refrigerant from the generator to the absorber and a second path of flow for absorption liquid strong in refrigerant from the absorber to the generator, a bypass connected between the first and second paths of flow to cause a flow of absorption liquid weak in refrigerant therethrough, an auxiliary absorber in the bypass and connected to the absorber to receive non-condensible gases therefrom, the absorption liquid weak in refrigerant flowing through the auxiliary absorber absorbing refrigerant vapor to segregate non-condensible gases therein, a cooling coil surrounding the outside of the auxiliary absorber to remove the heat of absorption therefrom, a storage vessel connected to the bypass, and a fall tube pump in the bypass utilizing the flow of absorption liquid therethrough to transfer the non-condensible gases from the auxiliary absorber to the storage vessel.

16. An absorption refrigeration system having a generator and condenser operable at one pressure and an evaporator and absorber operable at a lower pressure, means interconnecting the elements to provide a closed circuit for the circulation of a refrigerant and absorbent and maintain the pressure differential, said last named means including a first path of flow for absorption liquid weak in refrigerant from the generator to the absorber and a second path of flow for absorption liquid strong in refrigerant from the absorber to the generator, a bypass having one end connected to the first path of flow adjacent the absorber to receive liquid therefrom at low pressure and having its opposite end connected to the second path of flow adjacent the generator to deliver absorption liquid at a higher pressure, an auxiliary absorber in the bypass and connected to the absorber to receive non-condensible gases therefrom, said absorption liquid weak in refrigerant flowing through the auxiliary absorber absorbing refrigerant vapor to segregate the non-condensible gases therein, a storage vessel connected to the bypass, and a fall tube pump in the bypass utilizing the flow of absorption liquid therethrough to transfer the non-condensible gases from the auxiliary absorber to the storage vessel.

THE NATIONAL CITY BANK OF
    EVANSVILLE, INDIANA,
By JOHN N. EMIG,
    *V. P. & Trust Officer.*
*Administrator of the Estate of Albert R. Thomas, Deceased.*